United States Patent [19]

White et al.

[11] 3,988,929

[45] Nov. 2, 1976

[54] HANDLE AND REFLECTOR ASSEMBLY FOR MICROWAVE OVEN FOOD TEMPERATURE SENSING PROBE

[75] Inventors: James A. White; Richard E. Hornung, both of Louisville, Ky.

[73] Assignee: General Electric Company, Louisville, Ky.

[22] Filed: Dec. 22, 1975

[21] Appl. No.: 643,091

[52] U.S. Cl. .............................. 73/352; 73/362 AR; 219/10.55 R
[51] Int. Cl.² ..................... G01K 1/08; G01K 7/24; H05B 9/06
[58] Field of Search .......... 73/339 R, 352, 362 AR; 99/342, 421 TP; 219/10.55 F, 10.55 M, 10.55 R; 250/505; 340/228 R

[56] References Cited
UNITED STATES PATENTS

| | | |
|---|---|---|
| 2,607,872 | 8/1952 | Enabnit ........................... 73/352 X |
| 3,431,381 | 3/1969 | Anderson ..................... 219/10.55 F |
| 3,815,113 | 6/1974 | Welch .............................. 73/352 X |

Primary Examiner—Richard C. Queisser
Assistant Examiner—John S. Appleman
Attorney, Agent, or Firm—Steven C. Schnedler; Francis H. Boos

[57] ABSTRACT

A disc-like reflector, in addition to preventing excessive cooking of the food in a region immediately adjacent the probe housing, functions as a spring to hold the handle and reflector assembly together. The assembly remains tightly together despite different coefficients of thermal expansion of the various component parts.

5 Claims, 3 Drawing Figures 3,988,929

HANDLE AND REFLECTOR ASSEMBLY FOR MICROWAVE OVEN FOOD TEMPERATURE SENSING PROBE

BACKGROUND OF THE INVENTION

1. Field of the Invention

The present invention relates to a microwave oven food temperature-sensing probe assembly which prevents over-cooking of the food in a region immediately adjacent the probe, such as is disclosed and claimed in copending application Ser. No. 643,092, filed Dec. 22, 1975, concurrently herewith, by Flora L. Meek and Richard E. Hornung, entitled "Microwave Oven Food Temperature-Sensing Probe Assembly Including a Reflector", and assigned to the same assignee as the present invention. More particularly, the present invention relates to a handle and reflector assembly for such a probe assembly.

2. Description of the Prior Art

Electric thermometer probes which monitor the internal temperature of the food while it is being cooked have been developed for use in microwave ovens. Examples of such probes, adapted for use in microwave ovens, are disclosed and claimed in copending application Ser. No. 616,049, filed Sept. 23, 1975, by David Y. Chen and Louis H. Fitzmayer, and in copending application Ser. No. 616,050, filed Sept. 23, 1975, by Louis H. Fitzmayer, each entitled "Food Thermometer for Microwave Oven", and assigned to the same assignee as the present invention. Such probes comprise a needle-like probe adapted to be driven into the food and a temperature-sensing element, such as a thermistor, positioned internally of the probe housing near the distal end thereof. A flexible shielded cable connects the thermistor to circuitry which is responsive to the thermally-induced changes in its resistance. The cable shield is electrically connected at one end to the probe housing and at the other end to a wall of the oven cooking cavity. In the embodiments disclosed in the above-mentioned Chen and Fitzmayer application Ser. No. 616,049, the total effective electrical length of the probe and the cable, measured along the cable and probe from the cooking cavity wall to the distal end of the probe, is selected to be approximately equal to $n \lambda/2$, where $n$ is any integer and $\lambda$ is the wavelength of the microwaves being used to cook the food in the oven. Such a probe and cable assembly may successfully be operated in a microwave oven with minimal direct heating of the probe and cable by the microwave energy.

In general, probes of the above-described type operate satisfactorily and do minimize problems caused by direct heating of the probe and cable by the microwave energy. However, when they are used to monitor the internal temperature of certain foods, including meats and baked potatoes, over-cooking of the food in a cone-shaped region immediately adjacent the probe (generally along the length of the probe) sometimes occurs. This is considered undesirable from the standpoint of appearance of the food after it has been cooked. Further, the temperature-sensing probe necessarily responds to the temperature of the food in the region immediately adjacent the probe. When the food in this immediately adjacent region cooks faster than the other regions of the food, there is an indication of doneness before the bulk of the food (all the other desired regions within the food) is fully cooked to the desired degree of doneness. The condition which results in overcooking of the food in the region immediately adjacent the probe has been termed "feed in" because the cable and probe seemingly pick up microwave energy present within the cooking cavity and feed or direct the energy into the food along the length of the probe.

The above-described feed in effect is to be distinguished from a premature indication of doneness due to direct heating of the probe by the microwave energy, one of the problems to which the inventions comprising the subject matter of the above-mentioned copending Chen and Fitzmayer application Ser. No. 616,049, and the above-mentioned Fitzmayer application Ser. No. 616,050 are directed. When a feed in problem occurs, the probe may be accurately sensing temperature; the temperature of the food which the probe is sensing is simply not the temperature of the food as a whole.

The above-mentioned copending Meek and Hornung application Ser. No. 643,092 discloses and claims a microwave oven food temperature-sensing probe assembly which, in order to eliminate the "feed in" problem, includes a disc-shaped reflector positioned along the probe housing. By the present invention, there is provided a handle and reflector assembly which may be used as a part of the Meek and Hornung probe.

SUMMARY OF THE INVENTION

It is an object of the invention to provide a handle and reflector assembly for a microwave oven food temperature-sensing probe assembly.

It is another object of the invention to provide such a handle and reflector assembly which may be readily assembled.

It is still another object of the invention to provide such an assembly which avoids problems due to different rates of thermal expansion and contraction of its component parts.

These and other objects are accomplished by the present invention which includes a reflector which, in addition to preventing feed in, functions as a spring to hold the handle and reflector assembly together in a manner which allows for thermal expansion and contraction. The reflector is disc-like and is made of a resilient material. An insulating member includes a handle portion and a reflector back-up portion. The reflector back-up portion is configured to contract one side of the reflector in an annular region near the periphery of the reflector and to be spaced from the reflector in other regions. The space formed thereby permits elastic deformation of the reflector. A sleeve is inserted through an axial bore in the handle and through a hole in the center of the reflector. In order to deform the reflector slightly and to hold the assembly together, flanges at either end of the sleeve engage an internal holding ledge in the handle bore and the front of the reflector.

The term "reflector" is used in reference to the structure described herein on the assumed theory of operation that the structure operates to reflect microwave energy propagating along the cable towards the probe (and the food) back away from the probe (and the food) towards the oven wall end of the cable. While the explanation of the operation of the invention herein is believed to be correct, it is realized that other, presently unappreciated, principles of operation may be applicable and that, in such event, the reflector, as described herein, may not actually be functioning as a reflector in the usual sense of the word. If such is ultimately deemed to be the case, then the term "reflector" is intended, nevertheless, to mean the structure as described herein and its equivalents.

BRIEF DESCRIPTION OF THE DRAWINGS

While the novel features of the invention are set forth with particularity in the appended claims, the invention, as to organization and content, will be better understood and appreciated, along with other objects and features thereof, from the following detailed description taken in conjunction with the drawings, in which:

DESCRIPTION OF THE PREFERRED EMBODIMENT

Figure 1:
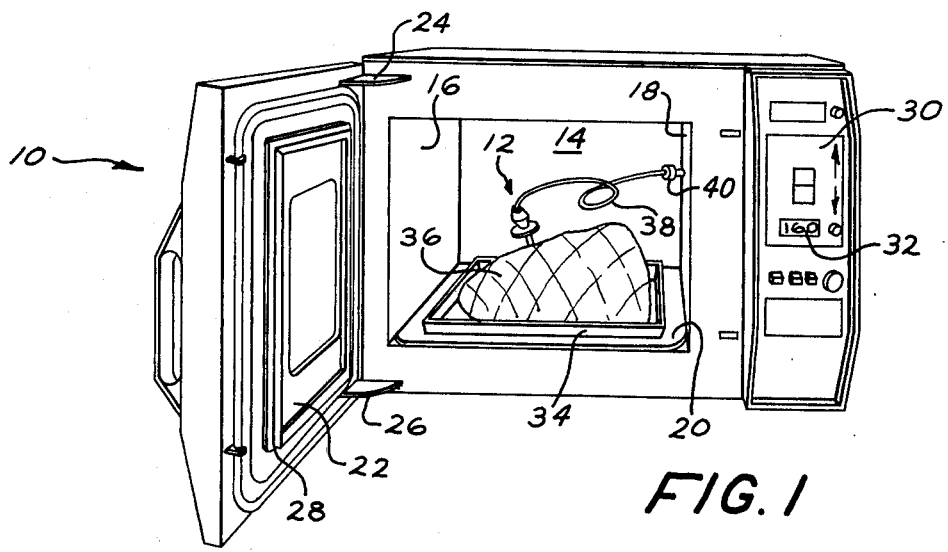
FIG. 1 is a front perspective view of a counter-top microwave oven shown with the oven door open and illustrating a portion of a food temperature-sensing probe including a handle and reflector assembly embodying the principles of the present invention.

Referring first to FIG. 1, there is illustrated a countertop microwave oven, generally designated by the numeral 10, including a food temperature-sensing probe assembly 12 embodying features of the present invention. The oven 10 includes a cooking cavity generally designated at 14, defined by side walls 16 and 18, a top wall (not shown), a bottom 20, and a door 22. The door 22 is shown in its open position and is hingedly supported at the left side by hinges 24 and 26. The door 22 also includes a conventional microwave energy seal, shown generally at 28, to prevent the escape of microwave energy from the cooking cavity 14. The oven 10 further includes a control panel 30 which includes a temperature-setting control 32.

As is conventional, the oven 10 is also provided with a magnetron (not shown) for generating microwaves of a predetermined frequency, preferably at a nominal frequency of 2450 MHz. The oven 10 further includes a waveguide (not shown) for transmitting the microwave energy from the output of the magnetron to the interior of the cooking cavity 14.

Within the cooking cavity 14, there is shown a shallow container 34 constructed of a material transparent to microwaves, such as a Pyrex dish, containing therein a piece of food 36, shown for purposes of illustration as a half of a ham. The ham 36 is to be cooked to an internal temperature of approximately 160° F. A portion of the probe assembly 12 is inserted into the ham 36 and is connected to control circuitry (not shown) contained within the oven 10 by means of a flexible shielded cable 38 and a connector 40 mounted on the oven side wall 18. Details of suitable circuitry which may be used in conjunction with the probe assembly 12 is disclosed in copending application Ser. No. 634,336, filed Oct. 21, 1975, by Richard E. Hornung, entitled "Food Temperature Responsive Control Apparatus", and assigned to the same assignee as the present invention. Preferably, the circuitry serves to turn off the magnetron and operate an audible indicator when the internal temperature of the ham 36 reaches the temperature set on the temperature-setting control 32.

Figure 2:
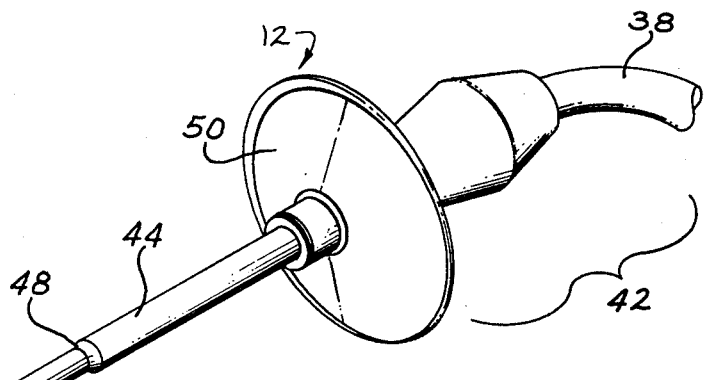
FIG. 2 is an enlarged perspective view of the temperature-sensing probe shown in FIG. 1.
Figure 3:
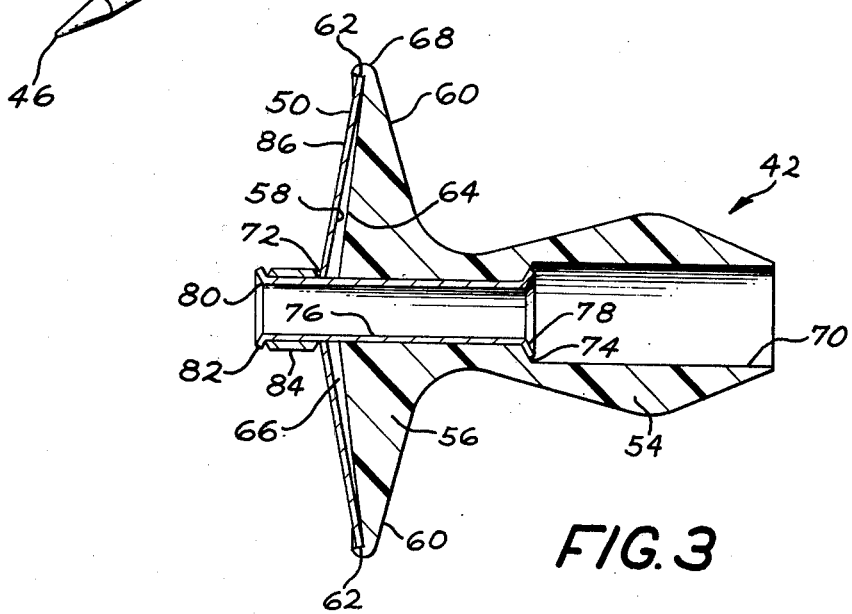
FIG. 3 is a further enlarged cross-sectional view of the handle and reflector assembly included in the probe shown in FIGS. 1 and 2.

Referring now to FIGS. 2 and 3, there is shown a better view of the probe assembly 12 (FIG. 2) and of a handle and reflector assembly 42 constructed in accordance with the present invention. The probe assembly 12 includes a tubular electrically-conductive housing 44 surrounding a temperature-sensing thermistor (not shown) located internally of the housing 44 near the distal end or tip 46 thereof. In order to show the minimum recommended insertion depth of the probe housing 44 into the food 36, an indicator 48, in the form of an enlargement in diameter, is included on the housing 44. The indicator 48, however, forms no part of the present invention, but, rather, is a part of the subject matter of copending application Ser. No. 643,109, filed Dec. 22, 1975, concurrently herewith, by Richard E. Hornung, and entitled "Microwave Oven Food Temperature-Sensing Probe Assembly".

The flexible shielded cable 38 serves to electrically connect the thermistor to the circuitry. The ends of the cable shield (not shown) are electrically connected to the probe housing 44 and to the oven wall 18 (FIG. 1). For a temperature-sensing probe assembly which is to be used in a microwave oven, it is preferable to make the total effective electrical length of the probe and the cable, measured along the cable 38 and the probe housing 44 from the cooking cavity wall 18 to the distal end or tip 46, approximately equal to $n \lambda/2$, where $n$ is any integer and $\lambda$ is the wavelength of the microwave energy being used to cook the food, as is taught by the abovementioned Chen and Fitzmayer application Ser. No. 616,049. As is more fully explained in the Chen and Fitzmayer application, when the total effective electrical length is so selected, heating of the probe and cable by direct action of the microwave energy is minimized. Therefore, for best results, the length should be so selected. It is believed, however, that substantial benefits of the present invention may still be obtained when the total effective electrical length of the probe and cable is other than that which is taught in the Chen and Fitzmayer application.

In accordance with the present invention, there is provided a disc-shaped reflector 50 made of resilient, electrically-conductive material such as thin stainless steel. The reflector 50 is slightly convex when viewed from the tip end of the probe assembly 12. Additionally, there is provided an insulating member 52 having a handle or gripping portion 54 for manual manipulation and a reflector back-up portion 56. The reflector back-up porton 56 is configured to contact one side 58 of the reflector 50 in an annular region 60 near the periphery 62 thereof. The back-up portion 56 is spaced from the reflector 50 in a generally circular region 64 bounded by the annular region 60. A gap 66 is thereby formed between the one side 58 of the reflector 50 and the circular region 64 of the reflector back-up portion 56. The gap 66 permits elastic deformation of the reflector 50 towards the member 52. The outer edge 68 of the reflector back-up portion 56 extends slightly over the peripheral edge 62 of the reflector 50, thereby forming a slight recess for the reflector 50. Additionally, the outer edge 68 provides electrical insulation between the reflector periphery 62 and any metallic object which the periphery might otherwise contact.

An axial bore 70 extends through the member 52 and opens in the center of the face of the reflector back-up portion 56. There is a corresponding centrally-located hole 72 in the reflector 50. Internally of the axial bore 70 there is included a holding ledge 74. While the ledge 74 is shown as a reduction in diameter of the bore 70, it will be apparent that other forms are possible. For example, the ledge 74 could be an inwardly-projecting ring with no change in diameter of the bore 70, or a plurality of spaced projections might be employed. A sleeve 76 is inserted through the axial bore 70 and the hole 72. The end of the sleeve 76 internal to the member 52 has an internal outwardly-extending flange 78 contacting the side of the ledge 74 opposite the opening in the face of the back-up portion 56. The external end 80 of the sleeve 76 extends out the opening in the face of the back-up portion 56 and through the hole 72 in the reflector 50. The sleeve end 80 includes means, such as a flange 82 and a cylindrical collar 84, for contacting the other side 86 of the reflector 50 to elastically deform the reflector 50. The sleeve 76 is thereby placed in tension and the collar 84 and reflector 50 are in compression.

The inside diameter of the sleeve 76 is large enough that the probe housing 44 can be inserted. The handle and reflector assembly 42 is firmly attached to the probe housing 44 by reducing the diameter of the collar 84, and that part of the sleeve 76 which is inside the collar 84, by swaging.

In operation, the reflector 50 performs the dual functions of preventing feed in and of holding the assembly 42 together. As the temperature of the probe assembly 12 changes, the different components undergo different degrees of thermal expansion and contraction due to different thermal coefficients. The degree of reflector deformation varies slightly to accommodate these changes but, at the same time, the reflector holds the component parts of the handle assembly 42 tightly together.

While a specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A handle and reflector assembly for a microwave oven food temperature-sensing probe, said assembly comprising:
    a. a reflector made of resilient, electrically-conductive material and having a centrally-located hole;
    b. an insulating member having a gripping portion for manual manipulation, a reflector back-up portion, and an axial bore extending through said insulating member and opening in the center of said back-up portion,
    said back-up portion configured to contact one side of said reflector in an annular region near the periphery of said reflector and to be spaced from said reflector in the region bounded by the annular region, and
    said axial bore including an internal holding ledge; and
    c. a sleeve inserted through said axial bore in said insulating member and through the hole in said reflector,
    one end of said sleeve having an internal flange contacting said internal holding ledge on the side of said ledge opposite the opening in said back-up portion, and
    the other end of said sleeve extending out the opening in said back-up portion and through the hole in said reflector and having means for contacting the other side of said reflector to elastically deform said reflector, said sleeve being in tension and said reflector being in compression.

2. The assembly of claim 1, wherein said means for contacting the other side of said reflector comprises:
    a. an external flange on the other end of said sleeve; and
    b. a collar placed around a portion of said sleeve extending out of the hole in said reflector, said collar interposed between said external flange and the other side of said reflector,
    said collar being adapted for fastening to a tubular probe housing inserted through said sleeve.

3. The assembly of claim 2, wherein said collar is adapted for fastening by swaging to a tubular probe housing inserted through said sleeve.

4. The assembly of claim 1, wherein said internal holding ledge is formed by a reduction in the inside diameter of said axial bore, the inside diameter being reduced between said holding ledge and said reflector back-up portion.

5. The assembly of claim 1, wherein said reflector is convex when viewed from the other side of said reflector.

* * * * *

UNITED STATES PATENT AND TRADEMARK OFFICE
CERTIFICATE OF CORRECTION

PATENT NO. : 3,988,929
DATED : November 2, 1976
INVENTOR(S) : JAMES A. WHITE and RICHARD E. HORNUNG It is certified that error appears in the above-identified patent and that said Letters Patent are hereby corrected as shown below:

In column 3, line 59, "Ser. No. 634,336" should read

-- Ser. No. 624,336 --.

*Signed and Sealed this*

*second Day of August 1977*

[SEAL]

*Attest:*

RUTH C. MASON
*Attesting Officer*

C. MARSHALL DANN
*Commissioner of Patents and Trademarks*